(12) United States Patent
Covezzi et al.

(10) Patent No.: US 10,611,901 B2
(45) Date of Patent: Apr. 7, 2020

(54) PROPYLENE BASED POLYMER COMPOSITION

(71) Applicant: BASELL POLIOLEFINE ITALIA S.R.L., Milan (IT)

(72) Inventors: Massimo Covezzi, Ferrara (IT); Paola Massari, Ferrara (IT); Claudio Cavalieri, Ferrara (IT); Roberta Marzolla, Ferrara (IT)

(73) Assignee: Basell Poliolefine Italia S.r.l., Milan (IT)

(*) Notice: Subject to any disclaimer, the term of this patent is extended or adjusted under 35 U.S.C. 154(b) by 19 days.

(21) Appl. No.: 16/061,258

(22) PCT Filed: Nov. 22, 2016

(86) PCT No.: PCT/EP2016/078417
§ 371 (c)(1),
(2) Date: Jun. 11, 2018

(87) PCT Pub. No.: WO2017/097579
PCT Pub. Date: Jun. 15, 2017

(65) Prior Publication Data
US 2018/0362748 A1 Dec. 20, 2018

(30) Foreign Application Priority Data

Dec. 11, 2015 (EP) .................................... 15199651
Oct. 11, 2016 (EP) .................................... 16193190

(51) Int. Cl.
| | | |
|---|---|---|
| C08L 23/14 | (2006.01) |
| C08L 23/12 | (2006.01) |
| C08F 210/06 | (2006.01) |
| B32B 27/08 | (2006.01) |
| B32B 27/32 | (2006.01) |
| C08J 5/18 | (2006.01) |

(52) U.S. Cl.
CPC ............. *C08L 23/14* (2013.01); *B32B 27/08* (2013.01); *B32B 27/32* (2013.01); *C08F 210/06* (2013.01); *C08J 5/18* (2013.01); *C08L 23/12* (2013.01); *B32B 2250/242* (2013.01); *B32B 2270/00* (2013.01); *C08J 2323/14* (2013.01); *C08J 2423/14* (2013.01); *C08L 2203/16* (2013.01); *C08L 2203/162* (2013.01); *C08L 2205/02* (2013.01); *C08L 2205/025* (2013.01); *C08L 2207/02* (2013.01)

(58) Field of Classification Search
CPC ..... B32B 27/08; B32B 27/32; B32B 2270/00; B32B 2250/242; C08F 210/06; C08F 2/001; C08F 210/14; C08F 2500/12; C08L 23/12; C08L 23/14; C08L 23/16; C08L 2203/16; C08L 2207/02; C08L 2205/02; C08L 2203/162; C08L 2205/025; C08J 5/18; C08J 2323/14
See application file for complete search history.

(56) References Cited

U.S. PATENT DOCUMENTS

| | | |
|---|---|---|
| 6,818,703 B2 | 11/2004 | Ebara et al. |
| 2013/0203931 A1 | 8/2013 | Paavilainen et al. |
| 2014/0147646 A1 | 5/2014 | Chen et al. |
| 2015/0051346 A1* | 2/2015 | Reichelt et al. ........ C08L 23/14 |
| | | 525/53 |

FOREIGN PATENT DOCUMENTS

| | | |
|---|---|---|
| JP | H10152530 A | 6/1998 |
| JP | 2007119746 A | 5/2007 |
| JP | 2010189474 A | 9/2010 |
| JP | 2012020471 A | 2/2012 |
| JP | 2015193831 A | 11/2015 |
| WO | 2009080485 A1 | 7/2009 |

OTHER PUBLICATIONS

International Search Report and Written Opinion dated Jan. 26, 2017 (dated Jan. 26, 2017) for corresponding PCT/EP2016/078417.

* cited by examiner

*Primary Examiner* — Nathan M Nutter

(57) ABSTRACT

A propylene polymer composition made from or containing:
a) from about 40 wt % to about 80 wt % of a propylene 1-hexene copolymer containing from about 5.5 to about 9.0% by weight, based upon the total weight of the propylene 1-hexene copolymer, of 1-hexene derived units and having a Melt Flow Rate (MFR, measured according to ASTM D 1238 at 230° C., with a load of 2.16 kg) from about 3.5 to about 12.0 g/10 min; and
b) from about 20 wt % to about 60 wt % of a propylene ethylene copolymer containing from about 1.5 wt % to about 6.5 wt % based upon the total weight of the propylene ethylene copolymer, of ethylene derived units, and having a Melt Flow Rate (MFR, measured according to ASTM D 1238, at 230° C., with a load of 2.16 kg) from about 3.5 to about 12.0 g/10 min;
the sum of a) and b) being 100.

15 Claims, No Drawings

PROPYLENE BASED POLYMER COMPOSITION

This application is the U.S. National Phase of PCT International Application PCT/EP2016/078417, filed Nov. 11, 2016, claiming benefit of priority to European Patent Application No. 15199651.9, filed Dec. 11, 2015 and European Patent Application No. 16193190.2, filed Oct. 11, 2016, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a composition made from or containing (a) a copolymer of propylene with 1-hexene and (b) a copolymer of propylene and ethylene, and films made therefrom.

BACKGROUND OF THE INVENTION

For some pipe applications, copolymers of propylene and 1-hexene, having from about 0.2 to about 5 wt %, based upon the total weight of the copolymer, of 1-hexene derived units and a monomodal, molecular weight distribution, are used.

For some industrial sheet applications, multimodal copolymers of propylene and 1-hexene having from about 0.6 wt % to about 3.0 wt %, based upon the total weight of the copolymer, of 1-hexene derived, are used.

SUMMARY OF THE INVENTION

In a general embodiment, the present disclosure provides a propylene polymer composition made from or containing:

a) from 40 wt % to 80 wt % of a propylene 1-hexene copolymer containing from about 5.5 to about 9.0% by weight, based upon the total weight of the propylene 1-hexene copolymer, of 1-hexene derived units and having a Melt Flow Rate (MFR, measured according to ASTM D 1238 at 230° C., with a load of 2.16 kg) from about 3.5 to about 12.0 g/10 min; and b) from 20 wt % to 60 wt % of a propylene ethylene copolymer containing from about 1.5 wt % to about 6.5 wt %, based upon the total weight of the propylene ethylene copolymer, of ethylene derived units, and having a Melt Flow Rate (MFR, measured according to ASTM D 1238 at 230° C., with a load of 2.16 kg) from about 3.5 to about 12.0 g/10 min;

the sum of the amount of a) and b) being 100.

DETAILED DESCRIPTION OF THE INVENTION

In a general embodiment, the present disclosure provides a propylene polymer composition made from or containing:

a) from about 40 wt % to about 80 wt %, alternatively, from about 45 wt % to about 74 wt %, alternatively from about 48 wt % to about 63 wt % of a propylene 1-hexene copolymer containing from about 5.5 to about 9.0% by weight, based upon the total weight of the propylene 1-hexene copolymer, alternatively from about 6.0 to about 8.5% by weight, alternatively from about 6.5 to about 8.0% by weight, of 1-hexene derived units, and having a Melt Flow Rate (MFR, measured according to ASTM D 1238 at 230° C., with a load of 2.16 kg) from about 3.5 to about 12.0 g/10 min, alternatively from about 3.8 to about 7.5 g/10 min, alternatively from about 4.0 to about 6.0 g/10 min;

b) from about 20 wt % to about 60 wt %, alternatively from about 26 wt % to about 55 wt %, alternatively from about 37 wt % to about 52 wt % of a propylene ethylene copolymer containing from about 1.5 wt % to about 6.5 wt %, based upon the total weight of the propylene ethylene copolymer, alternatively from about 2.0 wt % to about 6.1 wt %, alternatively from about 3.5 wt % to about 5.1 wt %, of ethylene derived units, and having a Melt Flow Rate (MFR, measured according to ASTM D 1238 at 230° C., with a load of 2.16 kg) from about 3.5 to about 12.0 g/10 min, alternatively from about 3.8 to about 7.5 g/10 min, alternatively from about 4.0 to about 6.0 g/10 min;

the sum of the amount of a) and b) being 100.

In some embodiments, the propylene 1-hexene copolymers component a) has one or more of the following features:

i) the DSC plot shows at least two melting temperature peaks having a difference in height ranging from about 0 to about 5 mW, alternatively from about 0 to about 3 mW; and ii) the higher melting temperature, measured by DSC, ranging from about 141.0° C. to about 151.0° C., alternatively from about 142.0° C. to about 149.0° C., alternatively from about 142.5° C. to about 145.0° C.

In some embodiments, the difference of the melting temperature of the two peaks ranges from about 5° C. to about 20° C., alternatively from about 7° C. to about 15° C., alternatively from about 8° C. to about 12° C.

In some embodiments, the propylene 1-hexene copolymer is free of comonomer units other than propylene and 1-hexene derived units. In some embodiments, the copolymer contains up to about 1.0 wt % by weight, based upon the total weight of the propylene 1-hexene copolymer, of ethylene derived units. In some embodiments, the propylene ethylene copolymer is free of comonomer units other than propylene and ethylene derived units. In some embodiments, the copolymer contains up to about 1.0 wt % by weight, based upon the total weight of the propylene ethylene copolymer, of 1-hexene derived units.

As used herein, the term "peak" in the DSC curve (temperature/heat of fusion (mW)) is defined as a point on the DSC curve (temperature/heat of fusion) having the highest value of heat of fusion at a temperature A with respect to the values of heat of fusion (mW) in the range±5° C. with respect to temperature A.

The melting temperature values are determined by differential scanning calorimetry, according to ISO 11357-3, with a heating rate of 20° C./minute.

In some embodiments, components a) and b) of the propylene polymer composition are obtained with polymerization processes carried out in the presence of stereospecific Ziegler-Natta catalysts supported on magnesium dihalides. In some embodiments, the process incorporates a molecular weight regulator. In some embodiments, the molecular weight regulator is hydrogen.

In some embodiments, the polymerization process is (a) continuous or batch and (b) carried out in a gas phase, in a liquid phase, or by mixed liquid-gas techniques. In some embodiments, the liquid phase is in the presence of inert diluent. In some embodiments, the polymerization in gas phase is carried out in two reactors.

In some embodiments, the polymerization reaction time, pressure and temperature can vary. In some embodiments, the temperature is from about 20 to about 100° C. In some embodiments, the pressure is atmospheric or higher.

In some embodiments, the stereospecific polymerization catalysts are made from or contain the product of the reaction between:

1) a solid component, containing a titanium compound and an electron-donor compound (internal donor) supported on magnesium dihalide;

2) an aluminum alkyl compound (cocatalyst); and, optionally, and 3) an electron-donor compound (external donor).

In some embodiments, the halogen in the magnesium dihalide is chlorine. In some embodiments, the catalysts are capable of producing homopolymers of propylene having an isotactic index higher than about 90% (measured as weight amount of the fraction insoluble in xylene at room temperature).

In some embodiments, the solid catalyst component (1) contains, as an electron-donor, a compound selected from the group consisting of ethers, ketones, lactones, compounds containing N, P and/or S atoms, and mono- and dicarboxylic acid esters.

In some embodiments, the catalyst is selected from the group of catalysts described in U.S. Pat. No. 4,399,054 and European Patent No. 45977, both incorporated herein by reference in their entirety.

In some embodiments, the electron-donor compounds are selected from the group consisting of phthalic acid esters and succinic acid esters.

In some embodiments, the succinic acid esters are represented by the formula (I):

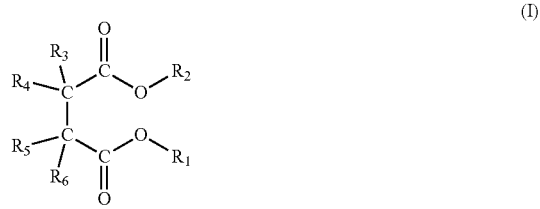

wherein the radicals $R_1$ and $R_2$, equal to or different from each other, are a C1-C20 linear or branched alkyl, alkenyl, cycloalkyl, aryl, arylalkyl or alkylaryl group, optionally containing heteroatoms; the radicals $R_3$ to $R_6$ equal to or different from each other, are hydrogen or a C1-C20 linear or branched alkyl, alkenyl, cycloalkyl, aryl, arylalkyl or alkylaryl group, optionally containing heteroatoms, and the radicals $R_3$ to $R_6$ which are joined to the same carbon atom can be linked together to form a cycle.

In some embodiments, $R_1$ and $R_2$ are selected from the group consisting of C1-C8 alkyl, cycloalkyl, aryl, arylalkyl and alkylaryl groups. In some embodiments, $R_1$ and $R_2$ are selected from the group consisting of primary alkyls, alternatively branched primary alkyls. In some embodiments, $R_1$ and $R_2$ groups are selected from the group consisting of methyl, ethyl, n-propyl, n-butyl, isobutyl, neopentyl, and 2-ethylhexyl. In some embodiments, $R_1$ and $R_2$ groups are selected from the group consisting of ethyl, isobutyl, and neopentyl.

In some embodiments, $R_3$ to $R_5$ are hydrogen and $R_6$ is selected from the group consisting of a branched alkyl, cycloalkyl, aryl, arylalkyl and alkylaryl radical having from 3 to 10 carbon atoms. In some embodiments, at least two radicals from $R_3$ to $R_6$ are different from hydrogen and are selected from the group consisting of C1-C20 linear or branched alkyl, alkenyl, cycloalkyl, aryl, arylalkyl or alkylaryl group, optionally containing heteroatoms. In some embodiments, the two radicals different from hydrogen are linked to the same carbon atom. In some embodiments, when at least two radicals different from hydrogen are linked to different carbon atoms, $R_3$ and $R_5$ are the radicals. In some embodiments, when at least two radicals different from hydrogen are linked to different carbon atoms, $R_4$ and $R_6$ are the radicals.

In some embodiments, the electron-donors are selected from the group of 1,3-diethers described in European Patent Application Nos. EP-A-361 493 and EP 0 728769, both incorporated herein by reference in their entirety.

In some embodiments, cocatalysts (2) are trialkyl aluminum compounds. In some embodiments, the trialkyl aluminum compounds are selected from the group consisting of Al-triethyl, Al-triisobutyl and Al-tri-n-butyl.

In some embodiments, the electron-donor compounds (3) that are used as external electron-donors (added to the Al-alkyl compound) are made from or contain a compound selected from the group consisting of aromatic acid esters, heterocyclic compounds, and silicon compounds containing at least one Si—OR bond (where R is a hydrocarbon radical). In some embodiments, the aromatic acid esters are alkylic benzoates. In some embodiments, the heterocyclic compounds are selected from the group consisting of 2,2,6,6-tetramethylpiperidine and 2,6-diisopropylpiperidine. In some embodiments, the silicon compounds are those of formula $R_a^1 R_b^2 Si(OR^3)_c$, where a and b are integer numbers from 0 to 2, c is an integer from 1 to 3 and the sum (a+b+c) is 4; $R^1$, $R^2$, and $R^3$ are alkyl, cycloalkyl or aryl radicals with 1-18 carbon atoms optionally containing heteroatoms.

In some embodiments, the silicon compound is thexyltrimethoxysilane (2,3-dimethyl-2-trimethoxysilyl-butane).

In some embodiments, the previously-described 1,3-diethers are external donors. In some embodiments, when the internal donor is a 1,3-diether, the external donor is omitted.

In some embodiments, the catalysts are precontacted with small quantities of olefin (prepolymerization), maintaining the catalyst in supension in a hydrocarbon solvent, and polymerizing at temperatures from room to 60° C., thereby producing a quantity of polymer from 0.5 to 3 times the weight of the catalyst.

In some embodiments, components a) and b) are blended.

In some embodiments, the propylene polymer composition is prepared by subsequential polymerization in two or more reactors wherein in the first reactor component a) is prepared and then component b) is prepared in a subsequent reactor in the presence of component a) or vice versa.

In some embodiments, the propylene polymer composition contains additives. In some embodiments, the additives are selected from the group consisting of nucleating and clarifying agents and processing aids.

In a general embodiment, the propylene polymer composition is used for the production of films. In some embodiments, the film is a cast or a biaxially-oriented polypropylene (BOPP) film. In some embodiments, the film can be a monolayer film or multilayer film, wherein at least one layer is made from or containing the propylene polymer composition.

In some embodiments, the multilayer films are characterized by having at least a skin layer made from or containing the propylene polymer composition. In some embodiments, the remaining layers are formed of other materials useful in multilayer films or film-coated products. In some embodiments, the other layers are from a polymer selected from the group consisting of polypropylene homopolymers, polypropylene copolymers, polyethylene homopolymers, polyethylene copolymers, EVA, and EVOH.

In some embodiments, the combination and number of the layers of the multilayer structure varies depending on the application. In some embodiments, the number is from 3 to 11 layers, alternatively from 3 to 9 layers, alternatively from 3 to 7 layers, alternatively from 3 to 5 layers and combinations selected from the group consisting of A/B/A, A/B/C, AB/CB/A, A/B/C/D/C/B/A, wherein at least a skin layer A is made from or contains the propylene polymer composition of the present disclosure.

In some embodiments, the layers of the multilayer film are 3 or 5 wherein at least one skin layer is made from or contains the propylene polymer composition. In some embodiments, the structure is A/B/A or A/B/C wherein A is the propylene polymer composition of the present disclosure.

As used herein, the term "skin layer" refers to the top layer or the bottom layer of a multilayer film.

In some embodiments, the top layer and the bottom layer of a multilayer film is made from or contains the propylene polymer composition.

EXAMPLES

The following examples are given to be illustrative without limiting the scope of this disclosure in any manner whatsoever.

The data relating to the polymeric materials and the films of the examples are determined by way of the methods reported below.

Melting Temperature (ISO 11357-3)

Determined by differential scanning calorimetry (DSC). A sample weighing 6±1 mg, was heated to 200±1° C. at a rate of 20° C./min and kept at 200±1° C. for 2 minutes in nitrogen stream and then was cooled at a rate of 20° C./min to 40±2° C., and then kept at this temperature for 2 min. Then, the sample was again melted at a temperature rise rate of 20° C./min up to 200° C.±1. The melting scan was recorded, a thermogram was obtained (° C. vs. mW), and, from the thermogram, temperatures corresponding to peaks were read. The temperature corresponding to the most intense melting peaks recorded during the second fusion was recorded as the melting temperatures.

Melt Flow Rate (MFR)

Determined according to ASTM D 1238, at 230° C., with a load of 2.16 kg.

Solubility in Xylene at 25° C.

2.5 g of polymer and 250 ml of xylene are introduced in a glass flask equipped with a refrigerator and a magnetical stirrer. The temperature was raised in 30 minutes up to the boiling point of the solvent. The solution was then kept under reflux and stirring for further 30 minutes. The closed flask was then kept for 30 minutes in a bath of ice and water and in thermostatic water bath at 25° C. for 30 minutes as well. The solid formed was filtered on quick filtering paper. 100 ml of the filtered liquid was poured in a pre-weighed aluminium container, which was heated on a heating plate under nitrogen flow, to remove the solvent by evaporation. The container was then kept in an oven at 80° C. under vacuum until constant weight was obtained. The weight percentage of polymer soluble in xylene at room temperature was then calculated.

Intrinsic Viscosity (IV)

Determined in tetrahydronaphthalene at 135° C.

Determination of 1-Hexene Content by NMR $^{13}$C NMR spectra were acquired on an AV-600 spectrometer operating at 150.91 MHz in the Fourier transform mode at 120° C. The peak of the propylene CH was used as internal reference at 28.83. The $^{13}$C NMR spectrum was acquired using the following parameters:

| | |
|---|---|
| Spectral width (SW) | 60 ppm |
| Spectrum center (O1) | 30 ppm |
| Decoupling sequence | WALTZ 65_64pl |
| Pulse program | ZGPG |
| Pulse Length (P1) | for 90° |
| Total number of points (TD) | 32K |
| Relaxation Delay | 15 s |
| Number of transients | 1500 |

The total amount of 1-hexene, as molar percent, was calculated from diad using the following relations:

$[P]=PP+0.5PH$ $[H]=HH+0.5PH$

Assignments of the $^{13}$C NMR spectrum of propylene/1-hexene copolymers have been calculated according to the following table:

| Area | Chemical Shift | Assignments | Sequence |
|---|---|---|---|
| 1 | 46.93-46.00 | $S_{\alpha\alpha}$ | PP |
| 2 | 44.50-43.82 | $S_{\alpha\alpha}$ | PH |
| 3 | 41.34-4.23 | $S_{\alpha\alpha}$ | HH |
| 4 | 38.00-37.40 | $S_{\alpha\gamma} + S_{\alpha\delta}$ | PE |
| 5 | 35.70-35.0 | $4B_4$ | H |
| 6 | 35.00-34.53 | $S_{\alpha\gamma} + S_{\alpha\delta}$ | HE |
| 7 | 33.75 33.20 | CH | H |
| 8 | 33.24 | $T_{\delta\delta}$ | EPE |
| 9 | 30.92 | $T_{\beta\delta}$ | PPE |
| 10 | 30.76 | $S_{\gamma\gamma}$ | XEEX |
| 11 | 30.35 | $S_{\gamma\delta}$ | XEEE |
| 12 | 29.95 | $S_{\delta\delta}$ | EEE |
| 13 | 29.35 | $3B_4$ | H |
| 14 | 28.94-28.38 | CH | P |
| 15 | 27.43-27.27 | $S_{\beta\delta}$ | XEE |
| 16 | 24.67-24.53 | $S_{\beta\beta}$ | XEX |
| 17 | 23.44-23.35 | $2B_4$ | H |
| 18 | 21.80-19.90 | $CH_3$ | P |
| 19 | 14.22 | $CH_3$ | H |

$^{13}$C NMR of Propylene/Ethylene Copolymers $^{13}$C NMR spectra were acquired on a Bruker AV-600 spectrometer equipped with cryoprobe, operating at 160.91 MHz in the Fourier transform mode at 120° C.

The peak of the $S_{\beta\beta}$ carbon (nomenclature according to C. J. Carman, R. A. Harrington and C. E. Wilkes, "Monomer Sequence Distribution in Ethylene-Propylene Rubber Measured by 13C NMR. 3. Use of Reaction Probability Mode" 10 Macromolecules 536 (1977), (hereinafter "Carmen") was used as internal reference at 29.9 ppm. The samples were dissolved in 1,1,2,2-tetrachloroethane-d2 at 120° C. with a 8% wt/v concentration. Each spectrum was acquired with a 90° pulse, 15 seconds of delay between pulses and CPD to remove 1H-13C coupling. 512 transients were stored in 32K data points using a spectral window of 9000 Hz.

The assignments of the spectra, the evaluation of triad distribution and the composition were made according to M. Kakugo, Y. Naito, K. Mizunuma and T. Miyatake, "Carbon-13 NMR determination of monomer sequence distribution in ethylene-propylene copolymers prepared with δ-titanium trichloride-diethylaluminum chloride" 15 Macromolecules 1150 (1982)) using the following equations:

$$PPP=100\ T_{\beta\beta}/S\ PPE=100\ T_{\beta\delta}/S\ EPE=100\ T_{\delta\delta}/S$$

$$PEP=100\ S_{\beta\beta}/S\ PEE=100\ S_{\beta\delta}/S\ EEE=100\ (0.25\ S_{\gamma\delta}+0.5\ S_{\delta\delta})/S$$

$$S=T_{\beta\beta}+T_{\beta\delta}+T_{\delta\delta}+S_{\beta\beta}+S_{\beta\delta}+0.25\ S_{\gamma\delta}+0.5\ S_{\delta\delta}$$

The molar percentage of ethylene content was evaluated using the following equation:
E % mol=100*[PEP+PEE+EEE]. The weight percentage of ethylene content was evaluated using the following equation:

$$E\ \%\ \text{wt.} = \frac{100*E\ \%\ \text{mol}*MW_E}{E\ \%\ \text{mol}*MW_E + P\ \%\ \text{mol}*MW_P}$$

where P % mol is the molar percentage of propylene content while $MW_E$ and $MW_P$ are the molecular weights of ethylene and propylene, respectively.

The product of reactivity ratio $r_1r_2$ was calculated according to Carmen as:

$$r_1r_2 = 1 + \left(\frac{EEE+PEE}{PEP}+1\right) - \left(\frac{P}{E}+1\right)\left(\frac{EEE+PEE}{PEP}+1\right)^{0.5}$$

The tacticity of propylene sequences was calculated as mm content from the ratio of the PPP $mmT_{\beta\beta}$ (28.90-29.65 ppm) and the whole $T_{\beta\beta}$ (29.80-28.37 ppm).

Seal Initiation Temperature (SIT)

Preparation of the Film Specimens

Some films with a thickness of 50 μm were prepared by extruding each test composition in a single screw Collin extruder (length/diameter ratio of screw 1:25) at a film drawing speed of 7 m/min and a melt temperature of 210-250° C. Each resulting film was superimposed on a 1000 μm thick film of a propylene homopolymer having a xylene insoluble fraction of 97 wt % and a MFR L of 2 g/10 min. The superimposed films were bonded to each other in a Carver press at 200° C. under a 9000 kg load, which was maintained for 5 minutes. The resulting laminates were stretched longitudinally and transversally, that is, biaxially, by a factor 6 with a TOM Long film stretcher at 150° C., thereby obtaining a 20 μm thick film (18 μm homopolymer+2 μm test). 2×5 cm specimens were cut from the films.

Determination of the SIT.

For each test, two of the specimens were superimposed in alignment, the adjacent layers being layers of the test composition. The superimposed specimens were sealed along one of the 2 cm sides with a Brugger Feinmechanik Sealer, model HSG-ETK 745. Sealing time was 5 seconds at a pressure of 0.1 N/mm². The sealing temperature was increased by 2° C. for each seal, starting from about 10° C. less than the melting temperature of the test composition. The sealed samples were left to cool and then the unsealed ends were attached to an Instron machine where the samples were tested at a traction speed of 50 mm/min.

As used herein, the SIT is the minimum sealing temperature at which the seal does not break when a load of at least 2 Newtons is applied in the test conditions.

Determination of the Haze

50 μm film specimens were prepared as described for the SIT measurements. The haze value was measured using a Gardner photometric unit connected to a Hazemeter type UX-10 or an equivalent instrument having G.E. 1209 light source with filter "C". Reference samples were used for calibrating the instrument.

Preparation of the Copolymer of Propylene with 1-Hexene

The copolymer was prepared as follows.

The solid catalyst component used in polymerization was a highly stereospecific Ziegler-Natta catalyst component supported on magnesium chloride, containing about 2.2% by weight of titanium and diisobutylphthalate as internal donor, prepared by analogy with the method described in Patent Cooperation Treaty Publication No. WO03/054035, incorporated herein by reference, for the preparation of catalyst component A.

Catalyst System and Prepolymerization Treatment

The solid catalyst component was contacted at 15° C. for about 6 minutes with aluminum triethyl (TEAL) and thexyltrimethoxysilane (2,3-dimethyl-2-trimethoxysilyl-butane), in a TEAL/thexyltrimethoxysilane weight ratio equal to about 7 and in such quantity that the TEAL/solid catalyst component weight ratio was equal to about 6.

The catalyst system was then subjected to prepolymerization by maintaining the catalyst system in suspension in liquid propylene at 20° C. for about 20 minutes.

Polymerization

The polymerization was carried out in two gas phase polymerization reactors by feeding in a continuous and constant flow the prepolymerized catalyst system, hydrogen (used as molecular weight regulator), propylene and 1-hexene in the gas state.

The main polymerization conditions are reported in table 1

TABLE 1

| first reactor | | first reactor | second reactor |
|---|---|---|---|
| Temperature: | ° C. | 75 | 75 |
| Pressure | bar-g | 16 | 16 |
| residence time | min | 46 | 46 |
| C6/C6 + C3 | mol/mol | 0.010 | 0.022 |
| H2/C3 | mol/mol | 0.016 | 0.017 |

C3 = propylene;
C6 = 1-hexene
H2 = hydrogen

The polymer particles exiting the reactor were subjected to a steam treatment to remove the reactive monomers and volatile substances, and then dried.

The property of the copolymer obtained in example 1 are reported in table 2.

TABLE 2

| | | component a) |
|---|---|---|
| 1-hexene content | wt % | 7.4 |
| MFR | g/10 min | 4.4 |
| xylene solubles 25° C. | wt % | 18.0 |
| melting temperatures | ° C. | 135.1-143.7 |
| Height DSC | mW | 22-24 |
| Haze (film) | % | 0.55 |
| SIT | ° C. | 91° C. |

Propylene Ethylene Copolymers

Two commercial propylene ethylene copolymers sold by LyondellBasell have been used to prepare the composition. The features of the propylene copolymers are reported in table 3.

TABLE 3

| | | component b1 | component b2 |
|---|---|---|---|
| C2 content | wt % | 2.2 | 4.6 |
| Tm | ° C. | 148 | 139 |

TABLE 3-continued

|  |  | component b1 | component b2 |
|---|---|---|---|
| MFR | g/10 min | 9 | 7.8 |
| haze | % | 0.25 | 0.30 |
| Xylene solubles 25° C. | wt % | 4.7 | 7.0 |
| SIT | ° C. | nm | 120 |

Nm not measured

Examples 1-5

Component a) was blended with various amounts of components b1) and b2). The features of the obtained composition are reported in table 4.

TABLE 4

|  |  | ex | | | | |
|---|---|---|---|---|---|---|
|  |  | 1 | 2 | 3 | 4 | 5 |
| comp b1 split | wt % | 40 | 50 | 0 | 0 | 0 |
| comp b2 split | wt % | 0 | 0 | 30 | 40 | 50 |
| Tm | ° C. | 141.7 | 143.3 | 137.4 | 134.4 | 135.7 |
| Xs | wt % | 9.5 | 7.5 | 13.3 | 13.1 | 11.3 |
| SIT | ° C. | 103 | 106 | 95 | 98 | 100 |
| haze | % | 0.14 | 0.14 | 0.21 | 0.15 | 0.16 |

Multilayer Film

The polymers of examples 1, 3 and 4 were used to produce a A/B/A multilayer film wherein the A layer are the polymers of the examples and the B layer is a propylene homopolymer MOPLEN HP515M sold by LyondellBasell. The film was 50 micron thick, wherein layer A was 20% of the overall thickness and layer B was 60% of the overall thickness. The processing parameters are reported in table 5.

TABLE 5

|  |  | Barrel temperature | Die (° C.) | $1^{st}$ chill roll | $2^{nd}$ Chill roll | Throughput Kg/h | Line speed m/min |
|---|---|---|---|---|---|---|---|
| Layer A (20) | Chill roll treated outside roll | 255 | 255 255 | 250 | 30 | 45 166 | 90 |
| Layer B (60) | Core | 240 | 250 250 |  |  | 391 + 107 |  |
| Layer C (20) | Internal sealing inside roll | 250 | 255 255 |  |  | 166 |  |

Samples of the obtained films were subjected to a corona treatment, and then the surface tension was measured after one week and after one month. The results are reported in table 6.

TABLE 6

| surface tension after days | Ex | |
|---|---|---|
|  | 3 dyne/cm | 4 dyne/cm |
| 1 | 40 | 40 |
| 7 | 40 | 40 |

TABLE 6-continued

| surface tension after days | Ex | |
|---|---|---|
|  | 3 dyne/cm | 4 dyne/cm |
| 30 | 40 | 40 |
| 60 | 40 | 40 |
| 90 | 40 | 40 |
| 150 | 40 | 40 |

What is claimed is:

1. A propylene polymer composition comprising:
   a) from about 40 wt % to about 80 wt % of a propylene 1-hexene copolymer containing from about 5.5 to about 9.0% by weight, based upon the total weight of the propylene 1-hexene copolymer, of 1-hexene derived units and having a Melt Flow Rate (MFR, measured according to ASTM D 1238, at 230° C., with a load of 2.16 kg) from about 3.5 to about 12.0 g/10 min., wherein in component a) a DSC plot shows at least two melting temperature peaks and the peak corresponding to the higher melting temperature ranges from about 141.0° C. to about 151.0° C.; and
   b) from about 20 wt % to about 60 wt % of a propylene ethylene copolymer containing from about 1.5 wt % to about 6.5 wt %, based upon the total weight of the propylene ethylene copolymer, of ethylene derived units, and having a Melt Flow Rate (MFR, measured according to ASTM D 1238 at 230° C., with a load of 2.16 kg) from about 3.5 to about 12.0 g/10 min; the sum of the amount of a) and b) being 100 wt %.

2. The propylene polymer composition according to claim 1, wherein component a) ranges from about 45 wt % to about 74 wt %; and component b) ranges from about 26 wt % to about 55 wt %, wherein the sum of the amount of a) and b) is 100 wt %.

3. The propylene polymer composition according to claim 2, wherein component a) ranges from about 48 wt % to about 63 wt % and component b) ranges from about 37 wt % to about 52 wt %, wherein the sum of the amount of a) and b) is 100 wt %.

4. The propylene polymer composition according to claim 1, wherein component a) contains from about 6.0 to about 8.5% by weight, based upon the total weight of the propylene 1-hexene copolymer, of 1-hexene derived units.

5. The propylene polymer composition according to claim 1, wherein component b) contains from about 2.0 wt % to about 6.1 wt %, based upon the total weight of the propylene ethylene copolymer, of ethylene derived units.

6. The propylene polymer composition according to claim 1, wherein in component a) the DSC plot shows at least two melting temperature peaks having a difference in height ranging from about 0 to about 5 mW.

7. The propylene polymer composition according to claim 1, herein in component a) the higher melting temperature, measured by DSC, ranges from 142° C. to 149° C.

8. The propylene polymer composition according to claim 1, wherein in component a) the difference of the melting temperature of the two peaks ranges from about 5° C. to about 20° C.

9. The propylene polymer composition according to claim 1, wherein in component a) the Melt Flow Rate (MFR, measured according to ASTM D 1238 at 230° C., with a load of 2.16 kg) ranges from about 3.8 to about 7.5 g/10 min.

10. The propylene polymer composition according to claim 1, wherein in component b) the Melt Flow Rate (MFR, measured according to ASTM D 1238 at 230° C., with a load of 2.16 kg) ranges from about 3.8 to about 7.5 g/10 min.

11. A film comprising:
(i) a propylene polymer composition comprising:
a) from about 40 wt % to about 80 wt % of a propylene 1-hexene copolymer containing from about 5.5 to about 9.0% by weight, based upon the total weight of the propylene 1-hexene copolymer, of 1-hexene derived units and having a Melt Flow Rate (MFR, measured according to ASTM D 1238, at 230° C., with a load of 2.16 kg) from about 3.5 to about 12.0 g/10 min.,
wherein in component a) a DSC plot shows at least two melting temperature peaks and the peak corresponding to the higher melting temperature ranges from about 141.0° C. to about 151.0° C.; and
b) from about 20 wt % to about 60 wt % of a propylene ethylene copolymer containing from about 1.5 wt % to about 6.5 wt %, based upon the total weight of the propylene ethylene copolymer, of ethylene derived units, and having a Melt Flow Rate (MFR, measured according to ASTM D 1238 at 230° C., with a load of 2.16 kg) from about 3.5 to about 12.0 g/10 min;
the sum of the amount of a) and b) being 100.

12. The film according to claim 11, selected from the group consisting of a cast film and a biaxially-oriented polypropylene film.

13. The film according to claim 11, wherein the film is a multilayer film.

14. The film according to claim 13 having from 3 to 11 layers.

15. The film according to claim 13 having an A/B/A or A/B/C structure wherein the A layer comprises the propylene polymer composition.

* * * * *

UNITED STATES PATENT AND TRADEMARK OFFICE
CERTIFICATE OF CORRECTION

PATENT NO. : 10,611,901 B2
APPLICATION NO. : 16/061258
DATED : April 7, 2020
INVENTOR(S) : Covezzi et al.

It is certified that error appears in the above-identified patent and that said Letters Patent is hereby corrected as shown below:

On the Title Page

Column 1, Item (30), Line 1, delete "15199651" and insert -- 15199651.9 --, therefor
Column 1, Item (30), Line 2, delete "16193190" and insert -- 16193190.2 --, therefor Signed and Sealed this
Eighth Day of November, 2022

Katherine Kelly Vidal
*Director of the United States Patent and Trademark Office*